March 10, 1942.　　J. F. HALDEMAN　　2,275,428
AQUARIUM WATER CONDITIONING DEVICE
Filed Jan. 2, 1937
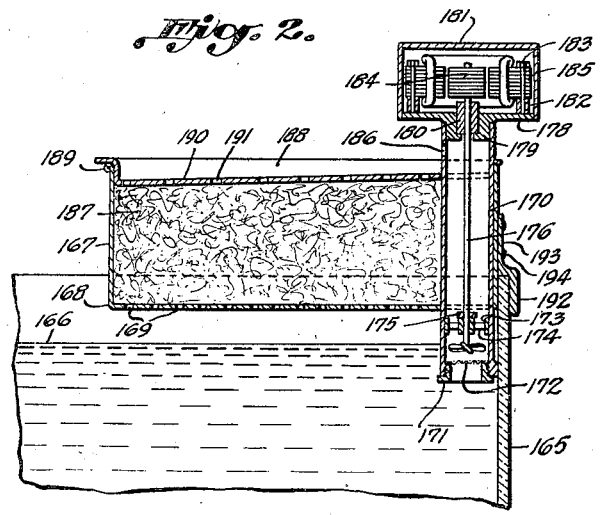
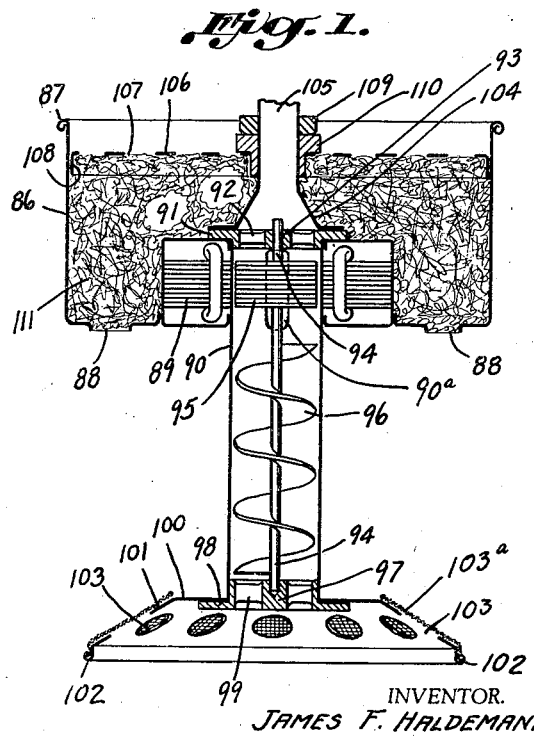
INVENTOR.
JAMES F. HALDEMAN.
BY Lockwood Goldsmith & Galt
ATTORNEYS.

Patented Mar. 10, 1942

2,275,428

UNITED STATES PATENT OFFICE 2,275,428

AQUARIUM WATER CONDITIONING DEVICE

James Fred Haldeman, Martinsville, Ind.

Application January 2, 1937, Serial No. 118,741

8 Claims. (Cl. 210—122)

This invention relates primarily to a circulatory, filtering and aerating device, suitable for aquariums and the like.

The present invention is directed to a device of the aforementioned general character and wherein the device is adapted for positioning in or mounting upon an aquarium for withdrawing water therefrom, aerating and filtering the same, and then returning the withdrawn water in aerated and filtered condition to the aquarium proper.

The chief object of this invention is to provide a structure which is relatively simple in construction and which is positive in its operation, and which may be readily applied to an aquarium, as hereinbefore.

The chief feature of the invention consists in the construction of the respective parts whereby a compact structure is obtained, and also an arrangement is provided whereby the device may be readily disassembled for removal of the filtering medium for the cleaning thereof.

Another feature of the invention consists in providing a screen for the intake of the device to prevent clogging thereof by seaweed, moss and the like.

Other objects and features will be more fully set forth hereinafter with reference to a detailed description of the several forms of the invention illustrated and described herein.

The full nature of the invention will be understood from the accompanying drawing and the following description and claims:

In the drawing, Fig. 1 is a central sectional view of an embodiment of the invention, wherein the filter structure is of adjustable character and the pump and motor associated therewith are positioned beneath the filter and the pump includes a coaxial and upwardly directed discharge, the filtering system being of the gravity type, the motor being superposed relative to the pump and partially enveloped by the filtering medium.

Fig. 2 is a sectional view through a modified form of the invention, in that there is herein disclosed, as distinguished from the coaxial types previously disclosed, a lateral type, to-wit, the filter structure is positioned laterally of the motor and pump structure and further distinguished from the aforementioned structures in that the entire device is detachably mounted upon a side wall of an aquarium instead of being mounted in an aquarium.

In Fig. 1 of the drawing there is illustrated a gravitation type filter system embodiment of the invention and in said Fig. 1, 86 indicates a tubular member having a beaded upper edge 87 and the lower portion is provided with a plurality of apertures 88 constituting the discharge of the device.

Mounted in sealed relation in the device is the stator 89 of a motor. The rotor opening therein receives a tube 90 which is closed by the member 91, the latter including apertures 92 and a central bearing 93 for the shaft 94, mounting the rotor 95. The shaft is extended downwardly and supports a pump impeller herein shown in the form of a spiral or screw 96 which rotates in the tube 90. The lower end of the shaft 94 is rotatably supported in the thrust bearing 97 carried by the plate 98 apertured as at 99. Plate 98 is suitably mounted within the lower end of tube 90 and is suitably secured to the central apertured portion of a foot structure 100 having the inclined portion 101 and the supporting bead or base portion 102. The inclined portion 101 is suitably apertured as at 103. These apertures 103 constitute the intake of the device. A conical screen 103a is retained by bead 102 and prevents seaweed, etcetera from clogging the device.

Suitably associated with the upper bearing structure 91—93 is an inwardly and upwardly flared portion 104 terminating in a tubular portion 105 which preferably may have associated with it the portions 58 to 60, inclusive, of Fig. 2, the latter, however, being of less area than the area of the filter chamber 86. The tube 105 supports an apertured plate 106 apertured as at 107 and including a down turned rim 108 telescopically associated with portion 86 of the filter chamber.

A nut structure 109 is associated with the bushing 110 carried by the plate 106. Suitable threaded engagement is provided so that the filtering medium 111 in the filtering chamber is maintained under the desired compression, if that be required. The water cycle is as follows: Water from the aquarium enters the inlet openings 103, passes through the apertures 99 upwardly through the pump tube having the screw 96 therein, thence around the rotor 95, thence through the openings 92 and through the upwardly tapering chamber within the member 104, and thence through the tube 105. If the structure 59—60 be associated therewith, the water discharges laterally over the rim 58a and thence falls upon the plate 106 and thence through the apertures 107 therein, thence through the filtering medium and finally discharges into the aquarium through the openings 88.

In Fig. 2 there is illustrated still a further modified form of the invention. Herein 165 indicates a side wall of the aquarium and 166 the normal water level therein. A tubular type container 167 has its bottom 168 apertured as at 169. Mounted in the chamber and extending through the same and at one side thereof is a tubular arrangement 170. The lower end of said tubular arrangement projects downwardly from the chamber 167—168 and extends into the water below the level 166 in the aquarium. The lower end of the tube 170 is closed by a sleeve 171 which supports a screen 172 preventing clogging of the device.

Mounted in the tube near said screen is an apertured flange structure 173 having apertures 174 and the bearing portion 175 for a shaft 176, the lower end of which terminates above the screen and mounts a pump impeller 177. The upper end of the tube 170 is closed by a base plate 178 having a tubular portion 179 therethrough which receives a seal 180 of suitable character and through which the shaft 176 projects. The plate is suitably associated with a cap 181 forming a motor chamber. Mounted on shaft 176 in the chamber is the rotor 184. Mounted within this chamber is stator 185 which in turn is suitably secured in relatively spaced relation to the plate 178 and by bushings 182 and bolts 183.

The tube 170 immediately adjacent its upper end is apertured as at 186 which constitutes a lateral discharge for the pump structure. Mounted in the chamber 168—167 is a suitable filtering medium, such as a sponge, 187. A plate or closure 188 is suitably supported on the rim 189 of portion 167 and includes an outwardly and downwardly inclined portion 190 having apertures 191 therein, the same being herein shown of progressively increasing area substantially in proportion to the distance from the lateral discharge 186.

The chamber forming portion 168 includes a suitable number of brackets, each of which has an offset portion 192 spaced from portion 167 and having a portion 193 suitably secured thereto as by rivets 194, or the like. With this type of support, the filtering structure is laterally positioned with reference to the pump and motor structure, and likewise the aforesaid structure is not of the submersible type.

The water cycle is as follows: Water is drawn in through the screen 172, forced upwardly by impeller 177 through the apertures 174, thence upwardly through the remainder of the tube 170 and discharged laterally through the opening 186 on to the plate 190. The water discharged on to this plate falls downwardly thereover and gradually discharges through the openings 191 to the filtering medium. The water then passes through the filtering medium, discharging at the bottom thereof, through the apertures 169 and thence falls into the aquarium. In this arrangement, as the water passes from the filter to the aquarium and from the pump, discharging to the distributing plate, it is aerated.

While the invention has been illustrated and described herein in great detail, the same is to be considered illustrative and not restrictive in character. The invention as thus described and illustrated, as well as other modifications thereof hereinbefore suggested, together with other modifications which will readily suggest themselves to persons skilled in this art, are all considered to be within the broad scope of the invention, reference being had to the appended claims.

The invention claimed is:

1. A unitary circulatory filtering and aerating portable device for a household aquarium and the like, including in combination a filter structure, an electric motor, a pump operable by the motor having an intake exposed to the aquarium near the bottom thereof for withdrawal of the dirty water therefrom for water passage through the filter for water cleaning, the circulating water being automatically aerated in its circulation, the filter structure discharging to the aquarium, and bracket means for aquarium side wall support of the unitary device the pump including a lateral discharge to the filter structure for gravity filtering, the filter structure being laterally offset from the pump and motor.

2. A unitary circulatory filtering and aerating portable device for a household aquarium and the like, including in combination a filter structure, an electric motor, a pump operable by the motor having an intake exposed to the aquarium near the bottom thereof for withdrawal of the dirty water therefrom for water passage through the filter for water cleaning, the circulating water being automatically aerated in its circulation, the filter structure discharging to the aquarium, and bracket means for aquarium side wall support of the unitary device the pump including a lateral discharge to the filter structure for gravity filtering the filter structure being laterally offset from the pump and motor, and a perforated inclined distributing means above the filter medium and below the pump discharge, the inclination being downwardly and outwardly from the discharge.

3. A unitary circulatory filtering and aerating device for aquariums and the like, including in combination, a tubular structure, a motor in one end thereof, a pump connected thereto and in the opposite end, said tubular structure including an intake and an outlet, screen means for the intake, and filter means for the outlet adapted to discharge to the aquarium, the intake being arranged for positioning in the aquarium below the liquid level therein.

4. A device as defined by claim 3, characterized by the filter means including a perforated dispensing cover, a filter medium container, and a filtering medium therein, the container including a discharge opening.

5. A device as defined by claim 3, characterized by the addition of bracket means upon the device for the mounting thereof within the aquarium but upon a side wall thereof.

6. A unitary circulatory filtering and aerating device for aquarium and the like, including in combination a filter structure, an electric motor, a pump operable by the motor, and means for suspending the unitized parts from an aquarium with the pump intake below the water level thereof and the effective filter discharge above the same.

7. A device as defined by claim 6, characterized by the pump and motor being coaxially aligned, the pump intake being coincident with the coaxial alignment and by the addition of a screen therefor.

8. A unitary portable aerating and filtering structure for mounting within an aquarium having a normal water level, said structure being independent of the aquarium, including in combination a motor having a stator, rotor and shaft, a pump having a housing, a rotary impeller and shaft directly connected to the motor shaft, a filter chamber, a filter medium therein, means unitarily connecting together the motor stator, pump housing and chamber, said pump discharging to the filter chamber for water passage therethrough, the discharge from the chamber being above the normal water level in the aquarium for water aeration purposes in the filter discharge of water to that level, and the pump housing having an effective intake at a level below the normal water level in the aquarium when the structure is aquarium associated, the motor, pump and chamber having axes which fall in a straight line.

JAMES FRED HALDEMAN.